United States Patent [19]

Saarem et al.

[11] Patent Number: 4,505,450
[45] Date of Patent: Mar. 19, 1985

[54] SOLENOID-OPERATED PILOT-ACTUATED VALVE

[75] Inventors: Myrl J. Saarem; Donald E. Lovelace, both of Carson City, Nev.

[73] Assignee: Richdel, Inc., Carson City, Nev.

[21] Appl. No.: 245,969

[22] Filed: Mar. 20, 1981

Related U.S. Application Data

[63] Continuation of Ser. No. 815,252, Jul. 13, 1977, abandoned.

[51] Int. Cl.³ .................... F16K 31/02; F16K 31/126
[52] U.S. Cl. .................... 251/24; 92/103 F; 251/30; 251/46; 137/244
[58] Field of Search .......... 251/30, 45, 46, 24; 137/484.2, 2; 92/103 F

[56] References Cited

U.S. PATENT DOCUMENTS

| | | | |
|---|---|---|---|
| 1,614,468 | 1/1927 | Haas | 251/46 |
| 2,776,812 | 1/1957 | Colendar | 251/45 |
| 3,460,798 | 8/1969 | Carsten | 251/46 |
| 3,967,808 | 7/1976 | Lieding | 251/46 |

FOREIGN PATENT DOCUMENTS

| | | | |
|---|---|---|---|
| 523183 | 10/1928 | Fed. Rep. of Germany | 137/484.2 |
| 1070896 | 12/1959 | Fed. Rep. of Germany | 251/30 |
| 72667 | 3/1916 | Switzerland | 251/45 |
| 461857 | 2/1937 | United Kingdom | 92/103 F |

Primary Examiner—George L. Walton
Attorney, Agent, or Firm—Keith D. Beecher

[57] ABSTRACT

A solenoid-operated pilot-actuated valve is provided of the diaphragm type which has particular utility for irrigation purposes. The valve also finds industrial utility where it is desirable to control large amounts of flow energy with a small control signal. The valve includes a diaphragm chamber into which fluid is introduced to establish a fluid pressure which normally forces the diaphragm against an annular seat in the valve to maintain the valve in a closed condition. A stationary bleed tube is provided which extends through the diaphragm into the diaphragm chamber. A solenoid plunger normally closes off the upper end of the bleed tube. However, when the solenoid is energized, the plunger is withdrawn and opens the bleed tube, the diaphragm chamber is drained sufficiently to reduce the pressure therein to a point at which the diaphragm is forced off its seat by the upstream fluid pressure, and the valve is opened. Fluid is introduced into the diaphragm chamber from the upstream fluid pressure when the valve is closed through a restricted annular passage between the bleed tube and a guide mounted on the diaphragm. Movement of the diaphragm causes the guide to move up and down with respect to the bleed tube to provide a self-cleaning action in the annular passage.

2 Claims, 1 Drawing Figure

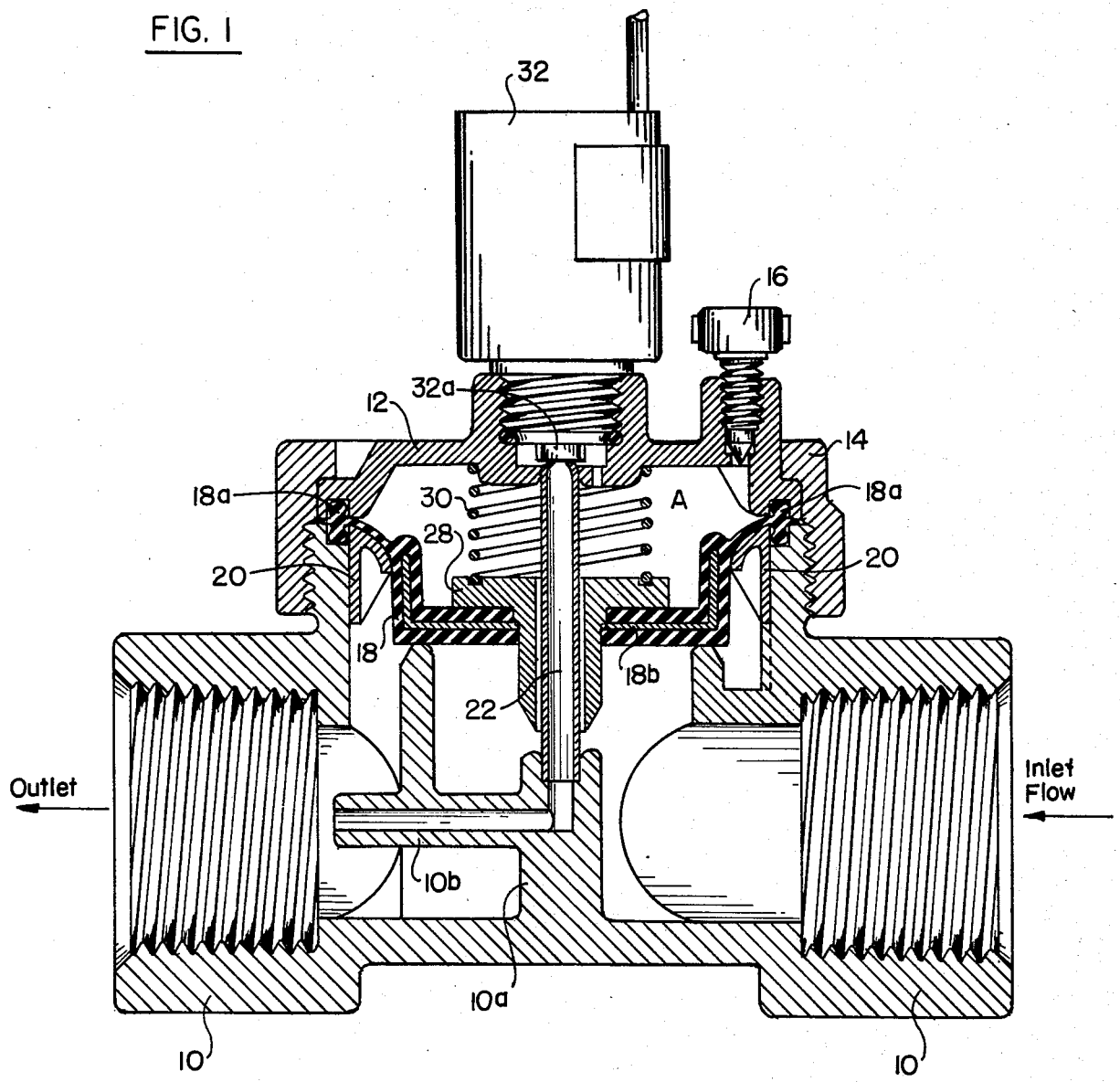

SOLENOID-OPERATED PILOT-ACTUATED VALVE

This application is a continuation of copending application Ser. No. 815,252 filed July 13, 1977, now abandoned.

BACKGROUND OF THE INVENTION

Pilot-actuated solenoid-operated diaphragm valves for use in irrigation and industrial systems are known to the art. Valves of this general type are described, for example, in U.S. Pat. No. 3,336,843 and in U.S. Pat. No. 3,410,301. This type of valve includes a diaphragm which moves against or away from an annular seat within the valve to open or close the valve. The diaphragm is normally biased against the seat by a spring and by the upstream fluid pressure acting against the diaphragm. When the valve is to be opened, the fluid pressure against the diaphragm is relieved by leaking fluid out of the diaphragm chamber through a solenoid-controlled bleed tube. The present invention is concerned with an improved and simplified construction for such a valve, as will become evident from the following description.

BRIEF DESCRIPTION OF THE DRAWING

FIG. 1 is a sectional view of a solenoid-controlled pilot-actuated valve constructed in accordance with the concepts of the present invention.

DETAILED DESCRIPTION OF THE ILLUSTRATED EMBODIMENT

The valve assembly shown in the drawing includes a body 10 having an inlet and an outlet. A cap 12 is mounted on, and clamped to the body by means of a nut 14. This construction facilitates the assembly of the valve making it more economical to construct than valves with flange-type caps using multiple screws. A bleed screw 16 is threaded into a bleed hole in cap 10.

A diaphragm assembly 18 is mounted in body 10, and it includes an integral annular sealing bead 18a which is shaped like a figure "8" and which is held between the cap 12 and the body 10 by the nut 14. The diaphragm assembly also includes a metal ridged cup-shaped reinforcing member 18b, the diaphragm being molded to the cup-shaped member. The cup-shaped member contains a multiplicity of holes to facilitate the bond between it and the diaphragm during the molding operation. An annular divider 20 is also mounted in body 10 to provide a support for the diaphragm.

A bleed tube 22 is mounted in body 10 in press-fit with a vertical hollow support bracket 10a, the support bracket being integral with the body. The support bracket 10a is also integral with a port 10b which is concentric with the outlet of body 10. Bleed tube 22 extends upwardly through a diaphragm guide 28 into a chamber A in the upper portion of the valve. The diaphragm guide slides up and down the tube as the diaphragm moves to provide a self-cleaning action. The annular space between tube 22 and guide 28 provides a passage for the restricted flow of fluid from the inlet to chamber A above the diaphragm. This flow restriction provides damping, so that valve operation is slow and smooth, reducing the possibility of inducing water hammer in the system. The flow restriction also is designed so that the fluid flow rate from inlet into chamber A is always less than that through the bleed port, insuring that the valve will remain open when the bleed port is open. A spring 30 engages the diaphragm guide 28, and the spring biases the diaphragm 18 to a closed position against a seat in body 10.

A solenoid 32 is threaded into cap 12, and the plunger 32a of the solenoid normally bears against and closes the upper end of bleed tube 22. Plunger 32a has a rubber insert in order to seal the bleed tube when the solenoid is de-energized. The upper end of the bleed tube is appropriately formed to provide a smooth concentric sealing surface for the rubber insert.

When the solenoid 32 is de-energized, the rubber insert of plunger 32a is spring biased against the upper end of bleed tube 22 and forms a seal with the bleed tube. This prevents fluid in chamber A from exiting though the bleed tube. Thus, the valve remains closed by virtue of the pressure exerted on the upper surface of the diaphragm 18 by the fluid in chamber A, and this pressure forces the diaphragm against the seat of body 10.

When the solenoid is energized, plunger 32a lifts off the end of bleed tube 22, and the fluid in chamber A is then allowed to flow through the bleed tube into the interior of hollow bracket 10a, and out through the concentric port 10b. This reduces the pressure in chamber A sufficiently to permit the diaphragm 18 to be lifted off its seat against the force of spring 30 by the fluid within the lower portion of the valve.

As the diaphragm is lifted off its seat, the valve opens, and the flow of fluid through body 10 creates a fluid velocity around concentric port 10b at the outlet side of the valve. This creates a Venturi action which acts to draw more fluid through the port 10 and through bleed tube 22 from chamber A. This further reduces the pressure on the top side of diaphragm 18 and causes the diaphragm to move further from its seat increasing the opening in the valve, reducing the pressure loss through the valve at low volume flow conditions.

The invention provides, therefore, a simple and economical solenoid-operated valve in which the sole function of the solenoid is to open and close a bleed tube within the valve, so that the opening and closing of the diaphragm is effectuated by differential fluid pressures with the valve.

While a particular embodiment of the invention has been shown and described, modifications may be made. It is intended in the claims to cover the modifications which come within the true spirit and scope of the invention.

What is claimed is:

1. A solenoid-operated valve including: a body portion defining a lower chamber with an internal seat and an inlet extending into said lower chamber, said body portion further defining an outlet; a cap portion; a diaphragm assembly mounted in the valve in a position to be biased against the seat and against the flow of fluids through the valve so as to control the flow of fluids through the valve from the lower chamber to the outlet, said diaphragm assembly defining a closed upper chamber in the valve with said cap portion; said diaphragm assembly having an integral peripheral seal interposed between said cap portion and said body portion; an open-ended nut threaded to said body portion coaxial with said cap portion to clamp said cap portion to said body portion; a bushing-like guide member mounted in said diaphragm assembly and defining an aperture extending therethrough; a support bracket in said lower chamber integral with said body portion; a stationary open-ended bleed tube mounted on said support bracket and extending through the aperture in the diaphragm assembly from the lower chamber into the upper chamber, said bushing-like guide member forming an annular passage with the outer surface of said bleed tube for restricted flow of fluid from the lower chamber into the upper chamber at a rate less than the rate of flow of fluid through said bleed tube when the bleed tube is open; a solenoid mounted on the cap portion of said valve and having a plunger positioned normally to close the upper end of the bleed tube; and exit port means including an elongated tubular member mounted on said support bracket coaxially with said outlet and coupled to the lower end of the bleed tube through a passageway in said support bracket to provide a flow path from the upper chamber through the bleed tube and through the passageway in said bracket and through said elongated tubular member to said outlet when the plunger is retracted from the upper end of the bleed tube.

2. The solenoid-operated valve defined in claim 1, in which said diaphragm assembly has an internal metal cup-shaped reinforcing member.

* * * * *